US008736297B2

(12) United States Patent
Yelgin (10) Patent No.: US 8,736,297 B2
(45) Date of Patent: May 27, 2014

(54) METHOD FOR PRODUCTION OF A FAULT SIGNAL, AND AN ELECTRICAL PROTECTIVE DEVICE

(75) Inventor: Yilmaz Yelgin, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 498 days.

(21) Appl. No.: 13/054,598

(22) PCT Filed: Jul. 17, 2008

(86) PCT No.: PCT/EP2008/006078
§ 371 (c)(1),
(2), (4) Date: Jan. 18, 2011

(87) PCT Pub. No.: WO2010/006632
PCT Pub. Date: Jan. 21, 2010

(65) Prior Publication Data
US 2011/0163777 A1    Jul. 7, 2011

(51) Int. Cl.
*G01R 31/40* (2006.01)
*H02H 3/00* (2006.01)

(52) U.S. Cl.
USPC .......................... 324/764.01; 361/47; 361/80

(58) Field of Classification Search
USPC ........................................ 324/764.01; 361/80
See application file for complete search history.

(56) References Cited

U.S. PATENT DOCUMENTS

| 5,946,174 A * | 8/1999 | Kaiser ............................. 361/47 |
| 2003/0039086 A1 * | 2/2003 | Kase et al. ...................... 361/65 |
| 2006/0067095 A1 * | 3/2006 | Hou et al. ....................... 363/78 |
| 2008/0036559 A1 * | 2/2008 | Gajic et al. ....................... 335/7 |

FOREIGN PATENT DOCUMENTS

| DE | 41 00 646 A1 | 9/1992 |
| JP | 7 298 499 A | 11/1995 |
| JP | 2005-168108 A | 6/2005 |

OTHER PUBLICATIONS

Zeng Qingguo et al.: "Analysis and improvement of distance protection action in open-phase running state"; Sichuan Electric Power Technology, vol. 31, No. 1, pp. 14-19; CN; Feb. 29, 2008; English abstract.

* cited by examiner

*Primary Examiner* — Jermele M Hollington
*Assistant Examiner* — Hoang X Nguyen
(74) *Attorney, Agent, or Firm* — Laurence A. Greenberg; Werner H. Stemer; Ralph E. Locher (57) ABSTRACT

A fault signal indicates a single-pole or a double-pole fault in a three-phase electrical power grid which occurred during a present electric oscillation in the electrical power grid. The method assures that single-pole or double-pole faults occurring during oscillation can be detected with high reliability in that a symmetry signal is produced during the oscillation, which indicates whether the oscillation is symmetrical or unsymmetrical, and the phases of the electrical power grid are checked for an existing fault, wherein the symmetry signal is used for carrying out the check. The fault signal is produced if a fault was detected during the check. A protective device has an accordingly equipped control unit.

23 Claims, 7 Drawing Sheets

METHOD FOR PRODUCTION OF A FAULT SIGNAL, AND AN ELECTRICAL PROTECTIVE DEVICE

BACKGROUND OF THE INVENTION

Field of the Invention

The invention relates to a method for production of a fault signal which indicates a single-pole or a two-pole fault in a three-phase electrical power supply system, which fault has occurred during a present electrical oscillation in the electrical power supply system. The invention also relates to an electrical protective device for monitoring an electrical power supply system.

Electrical power supply systems are normally monitored in places by so-called protective devices for impermissible operating states, such as shorts or ground faults. When an impermissible operating state such as this occurs, the protective devices disconnect that part of the power supply system which has been affected by the fault from the rest of the system by opening appropriate circuit breakers, and thus avoid any danger to people and components of the electrical power supply system. The protective devices run so-called protection algorithms in order to monitor the individual sections of the electrical power supply system. In the process, measured values which, for example, may relate to measured values which characterize the current and the voltage at a measurement point in the electrical power supply system are used to decide whether the operating state is impermissible or permissible.

One protection algorithm which is frequently used for this purpose operates on the basis of the so-called distance protection method, in which impedance values which lie on a complex number plane are calculated from current and voltage measured values, and are checked to determine whether the impedance values are within a predetermined range, which is also referred to as a tripping polygon. If the impedance values are within this predetermined range, the distance protective device confirms an impermissible operating state on the section of the electrical power supply system being monitored by it, and sends a tripping signal to one or more circuit breakers which bounds or bound the section, in order to disconnect the faulty section from the rest of the power supply system. In the process, the distance protection algorithm distinguishes between so-called internal faults, which relate to that section of the power supply system which is being monitored directly by the distance protective device, and external faults, which are located outside this section and are within the direct responsibility area of another protective device. While a distance protective device causes its faulty section to be disconnected without delay in the event of internal faults, it is normally used as reserve protection for external faults. If another protective device, which is responsible for the external fault, does not disconnect the fault within a specific time interval, then the distance protective device which is acting as reserve protection causes disconnection after this time interval has elapsed.

When sudden load changes occur, or changes in the structure of the electrical power supply system (for example as a result of relatively large sections of system being connected or disconnected), so-called oscillation processes or system oscillations can occur in the electrical power supply system, and these will be referred to in the following text, for the sake of simplicity, as "oscillations", since the generators must adjust themselves to the new load situation at the feed points to the electrical power supply system. This is normally done in the form of a damped oscillation until the new operating point of the electrical power supply system has stabilized. During an oscillation, the current and voltage oscillate, so to speak, between high and low values along the power supply lines. It is therefore frequently possible when an oscillation occurs for an electrical distance protective device to measure low voltages with high currents at the same time at its measurement point, and from this to calculate low impedance values, which are within a tripping polygon. Since a damped oscillation—which is also referred to as a synchronous oscillation—does not, however, normally describe a dangerous operating state of the electrical power supply system, tripping should not take place in a situation such as this. If the distance protection function were simply to be applied, the distance protective device would, however, identify an impermissible operating state, and would disconnect the monitored section of the electrical power supply system. This can result in undesirable spurious disconnections of specific parts of the electrical power supply system, and such disconnections are normally associated with high costs for the operator of the electrical power supply system. Furthermore, because the system structure changes suddenly as a result of the spurious disconnection, sections of the electrical power supply system which are still connected may be overloaded, and this can lead to cascading disconnections, or even to a so-called blackout.

For the sake of completeness, it should be mentioned at this point that the invention which will be described later can be used both for synchronous oscillations and for so-called asynchronous oscillations, in which the impedance passes over at least one complete circular path. The term "oscillations" should therefore be understood in this sense (synchronous or asynchronous) in the following text.

In order to prevent undesirable spurious tripping in the event of oscillations, so-called oscillation identification devices are normally provided. When an oscillation identification device identifies an oscillation, it emits an oscillation signal. This oscillation signal may, for example, be used to block the output of a tripping signal to an electrical circuit breaker by a distance protective device. In this case, an oscillation identification device may either be an integrated component of a distance protective device or may be formed by a separate device which is operatively connected to a distance protective device.

Distance protective devices with integrated oscillation identification are marketed by the applicant, for example, under the name "SIPROTEC 7SA6 distance protection". The corresponding devices are known from the Siemens AG equipment manual "SIPROTEC 7SA6, V4.3, distance protection", from 2002, Siemens AG Order Number C53000-G1100-C156-3. Section 2.3 of this Equipment Manual "Measures in the event of system oscillations" describes that a curve profile, which is formed from impedance values on a complex number plane, is investigated for characteristic properties such as "continuity", "monotonicity" and "sudden-change response" for oscillation identification, and an oscillation signal is produced on the basis of the investigation results, if an oscillation is identified.

However, internal or external faults can also occur on oscillations at present, and must be identified by the protective device and, if appropriate, disconnected. Since the oscillation that is present is superimposed on the fault, fault identification is frequently possible only with difficulty. This relates, for example, to single-pole or two-pole faults, that is to say faults which affect one or two phases of the electrical power supply system since, in the event of faults such as these, an oscillation will also occur in at least one phase which is not faulty, while the oscillation and the fault will be superimposed in the faulty phases.

Particularly in the case of external faults, a fault on which an oscillation is superimposed can still have characteristic properties of an oscillation, for example a largely elliptical path curve profile of the recorded impedance values, as a result of which, in this situation, an oscillation signal which is present would render the reserve protection function of the distance protective device inoperative. For this reason, in the known distance protective devices, certain zones of the tripping polygon, in which the calculated impedance values would lie in the event of external faults, can be removed if required from the oscillation identification, in order to ensure the reserve protection function even in the event of oscillations.

Furthermore, certain internal faults on which an oscillation is superimposed, particularly when they occur at a long distance from the measurement point of the distance protective device (for example in the vicinity of the so-called "changeover boundary", that is to say at the boundary between an internal fault and an external fault), may still have characteristic properties of an oscillation, as a result of which an oscillation signal would also result in blocking of the protection function for a directly monitored section of the power supply system.

BRIEF SUMMARY OF THE INVENTION

The invention is based on the object of specifying a possible way to allow single-pole or two-pole faults which occur during an oscillation to be identified with a high degree of confidence.

According to the invention, this object is achieved by a method of the type mentioned initially in which a balance signal is produced during the oscillation, which indicates whether the oscillation is balanced or unbalanced, and the phases of the electrical power supply system are checked for the presence of a fault, using the balance signal to carry out the check. The fault signal is produced when a fault has been identified during the check.

The particular advantage of the method according to the invention is that a balance signal which contains a statement about the balance of the oscillation is used to carry out the check for a fault. A balanced oscillation occurs uniformly in all three phases of the power supply system, while an unbalanced oscillation differs in at least one of the phases, or is even restricted to one or two phases. Asymmetric oscillations can occur, inter alia, in those electrical power supply lines whose parallel line has been subject to a single-pole disconnection (a so-called "open pole in the parallel line"). Because of interactions, this single-pole disconnection in the parallel line also affects the power transmission line under consideration, and an oscillation taking place there can result in the unbalance. The fault identification can be matched to the present state of the power supply system by taking account of the balance signal.

Specifically, in this context, it is advantageous for the fault signal to result in the cancellation of an oscillation signal which indicates the oscillation.

A further advantageous development of the method according to the invention provides that in the case of a balance signal which indicates a balanced oscillation, the balanced components are determined from phase currents detected in the power supply system, in the form of a positive phase-sequence system current, a negative phase-sequence system current and a zero phase-sequence system current, and the check for the presence of a fault is carried out by a comparison of these balanced components. This allows a single-pole or two-pole fault to be identified using very simple means since the fault in its own right causes an unbalanced load state in the electrical power supply system, since the oscillation itself has been identified as balanced, and can therefore be excluded as a cause of the unbalance.

Specifically, in this context, it is possible that for checking, the sum of the zero phase-sequence system current and the negative phase-sequence system current is compared with the positive phase-sequence system current, and a fault is identified if the product of the sum and a factor exceeds the positive phase-sequence system current. This comparison makes it possible to identify an unbalance caused by a fault, and to produce a fault signal, with little effort.

In this context, it is also advantageously possible for the factor to be dynamically matched to the level of the positive phase-sequence system current, wherein a rising positive phase-sequence system current indicates a rise in the factor.

In the case of a balance signal which indicates a balanced oscillation, it is also possible that a check of a profile of impedance values is carried out in order to distinguish between a single-pole and a two-pole fault per phase. In this context, it is either possible to deduce the presence of a fault in the respective phase when at least one impedance value of the relevant phase is within a tripping range on the complex impedance plane, and the change between successive impedance values is below a predetermined threshold value or when at least one impedance value of the relevant phase is within a tripping range on the complex impedance plane, and a sudden change has occurred between successive impedance values. This phase-by-phase check allows the fault to be localized particularly easily.

The criterion of balanced components cannot be used for a balance signal which indicates an unbalanced oscillation. A further advantageous embodiment of the method according to the invention therefore proposes that in the case of a balance signal which indicates an unbalanced oscillation, a profile of impedance values is determined for each phase, and the presence of a fault in the respective phase is deduced on the basis of this profile. Although this fault identification method is more computation-intensive, because of the phase-by-phase checking of the impedances, than the analysis of the balanced components in the case of a balanced oscillation, it is, however, reliably possible to identify a fault in the respective phase in this way.

Specifically, it is possible in this case to deduce the presence of a fault in the respective phase if either at least one impedance value of the relevant phase is within a tripping range on the complex impedance plane and the change between successive impedance values is below a predetermined threshold value, or at least one impedance value of the relevant phase is within a tripping range on the complex impedance plane and a sudden change has occurred between successive impedance values. This allows a fault to be identified by relatively simple checks. In this case, the first-mentioned criterion indicates that successive impedance values scarcely differ from one another, and the impedance has effectively assumed a stationary value, specifically that of the fault impedance. The second criterion indicates a sudden change from an undefined operating point to a fault impedance during an oscillation.

An external fault should be disconnected by the respectively responsible protective device. After finding the cause of the fault, the oscillation may be continued on the remaining part of the power supply system. In a situation such as this, the distance protective device must identify the end of the fault and the continued oscillation. A further advantageous embodiment of the method according to the invention therefore provides, both for the case of balanced oscillations and unbalanced oscillations, that when a fault signal is present, continuous checking is carried out to determine whether the fault is still present and the fault signal is cancelled if the check indicates that the fault is no longer present.

Specifically, in this context, it is possible that in the case of a single-pole fault, in order to check whether the fault is still present, impedance values calculated with respect to the faulty phase are compared with impedance values calculated with respect to the sound phases, and the presence of the fault is deduced on the basis of the comparison. This embodiment is based on the knowledge that the impedance values of a faulty phase remain virtually constant at one point, while the impedance values of sound phases on which an oscillation is taking place vary continuously in amplitude and/or phase angle.

In this context, it is possible, by way of example, that the impedance values calculated with respect to the faulty phase are compared with the impedance values calculated with respect to the sound phases such that an end of the fault is deduced if the distances ("impedance paths") covered by the respective successive impedance values are approximately the same. In consequence, in this check, the distances covered by the respective impedance values are compared with one another, and the end of the fault is deduced when all the impedance values vary by the same amount, that is to say when the difference between the impedance path determined for the faulty phase and at least one impedance path determined for the sound phases is below a threshold value. Specifically, this indicates that the faulty phase is now oscillating to the same extent as the other phases, again.

In order to improve the reliability of identification of the end of a fault in the case of a single-pole fault, it is also possible that the balanced components of the phase currents are determined, and the balanced components are compared in order to deduce whether the fault is still present. This is because the recreation of the balanced state of the power supply system can thereby be identified. This additional criterion can, of course, be used only for the case of a balanced oscillation since, in the case of an unbalanced oscillation, no balanced state would be recreated after the end of the fault.

Specifically, in order to check the last-mentioned criterion, it is possible that the sum of the zero phase-sequence system current and the negative phase-sequence system current is compared with the positive phase-sequence system current, and an indication of the end of a fault is identified if the product of the sum and a factor is below the positive phase-sequence system current.

According to a further advantageous development of the method according to the invention, it is also possible that in the case of a two-pole fault, in order to check whether the fault is still present, test negative phase-sequence system current values are calculated from phase currents detected with respect to the sound phase and one of the two faulty phases and from assumed phase currents for a fictional phase which is shifted through 120° (that is to say the corresponding current vector is rotated through 120°) with respect to the sound phase, and these test negative phase-sequence system current values are compared with negative phase-sequence system current values calculated on the basis of the actual phase currents, and an end of the fault is deduced with respect to the respective faulty phase being considered if the quotient of the respective negative phase-sequence system current values and the respective test negative phase-sequence system current values is above a predetermined threshold value. This check is carried out individually for each of the two faulty phases, thus allowing the end of the fault to be identified for each phase. During the described check, a two-pole fault is effectively mapped by two single-pole faults by masking out one faulty phase in each case and replacing it by an imaginary oscillating phase. A statement about the continued presence or an end of the fault can then be made for the remaining faulty phase, by means of the described method.

The object mentioned above is also achieved by an electrical protective device which has a control device which is designed to carry out the method described above, or one of its developments.

The invention will be explained in more detail in the following text with reference to exemplary embodiments. In the figures:

DESCRIPTION OF THE INVENTION

Figure 1:
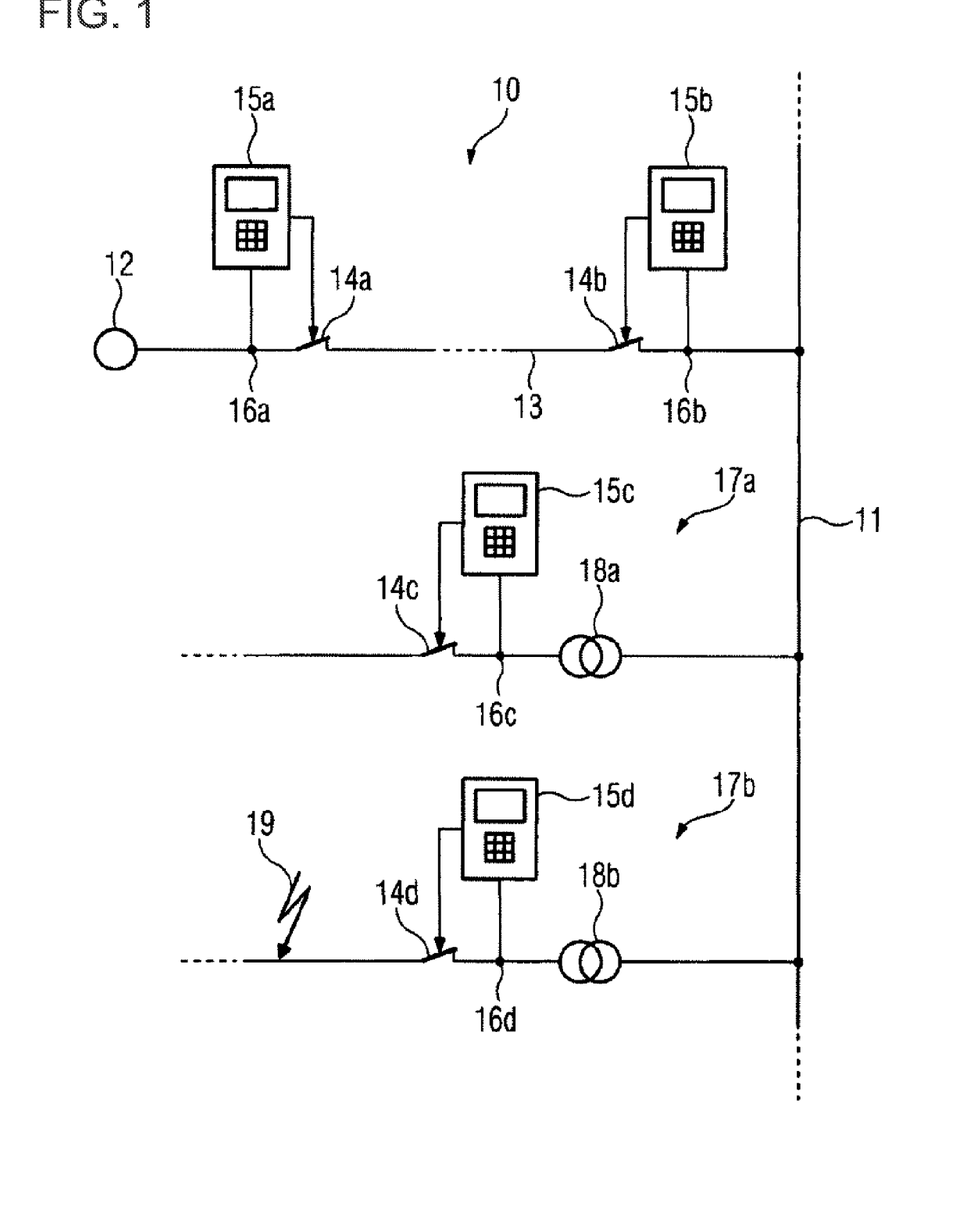
FIG. 1 shows a schematic illustration of a section of an electrical power supply system.

FIG. 1 shows an example of a section 10 of a three-phase electrical power supply system, which will not be described in any more detail in the following text. The section 10 of the electrical power supply system is fed with electrical power by means of a generator 12. A schematically indicated three-phase power transmission line 13 is located between the generator 12 and a busbar 11. The power transmission line 13 is provided with circuit breakers 14a and 14b, by means of which the power transmission line 13 can be disconnected from the remaining part of the section 10 of the electrical power supply system.

Protective devices 15a and 15b are provided in order to monitor the power transmission lines 13 for the possible occurrence of faults, for example shorts or ground faults, and these protective devices 15a and 15b are so-called distance protective devices. The protective devices 15a and 15b detect measured values in the form of current and voltage measured values at measurement points 16a and 16b, and use these measured values to decide whether the operating state of the power transmission line 13 is or is not permissible. Further details of the operations of a distance protective device have already been explained in more detail initially, and will therefore not be dealt with in detail again at this point.

If one of the protective devices 15a or 15b, or both, has or have identified an impermissible operating state on the power transmission line 13 associated with it, a tripping signal is output to the respective circuit breaker 14a or 14b, in order to disconnect the faulty power transmission line 13 from the remaining section 10 of the electrical power supply system. In this context, a fault signal can also be sent to the opposite end of the faulty power supply line, in order to cause the protective device there to also produce a corresponding tripping signal for its circuit breaker. As already mentioned initially, a fault which has occurred on the power transmission line which is being directly monitored by the respective protective device is also referred to as an "internal" fault.

Furthermore, two outgoers 17a and 17b are connected to the busbar 11. A first transformer 18a, for example a medium-voltage transformer, transforms the voltage present on the busbar 11 down to an appropriate level (for example a medium-voltage level) for the first outgoer 17a. A second transformer 18b is used for corresponding transformation for the second outgoer 17b.

The outgoers 17a and 17b can be disconnected from the busbar 11 in the event of a fault by further circuit breakers 14c and 14d. Further protective devices 15c and 15d are provided for this purpose, and may also be distance protective devices. These detect measured values at measurement points 16c and 16d and can use these measured values to decide whether there is a permissible or an impermissible operating state on the outgoers 17a and 17b.

By way of example, FIG. 1 is based on the assumption that a single-pole or two-pole fault, for example a ground fault, has occurred on the outgoer 17b at a fault location 19, which is identified by a lightning symbol. It is assumed that this fault has been detected by the protective device 15d which is directly responsible for the outgoer 17b, and has caused the circuit breaker 14d associated with it to disconnect its switching contacts, in order to disconnect the outgoer 17b from the busbar 11, and therefore to prevent the fault affecting the remaining part of the section 10 of the electrical power supply system. In the situation in which the fault is assumed to have been identified at the fault location 19 by the responsible protective device 15d, however, for example because of disturbance in the operation of the protective device 15d, the protective devices 15a and 15b are in the form of reserve protective devices. Once a time delay has elapsed, within which the protective device 15d has had the opportunity to react to the fault at the fault location 19, they send a tripping signal to their respective circuit breakers, in order to disconnect the fault at the location 19 in this way.

In this situation, in the example shown in FIG. 1, the protective device 15b would first of all open its circuit breaker 14b, while the protective device 15a would carry out a disconnection process only if the protective device 15b did not also disconnect the fault. Initially, the protective devices 15a and 15b perceive the fault which has occurred at the location 19 to be a so-called external fault since it is not located in the protection zone directly associated with them, in this case the power transmission line 13 or the busbar 11.

The identification of internal or external faults on the section 10 of the electrical power supply system can be made more difficult by a simultaneously occurring oscillation on that section of the electrical power supply system.

Figure 2:
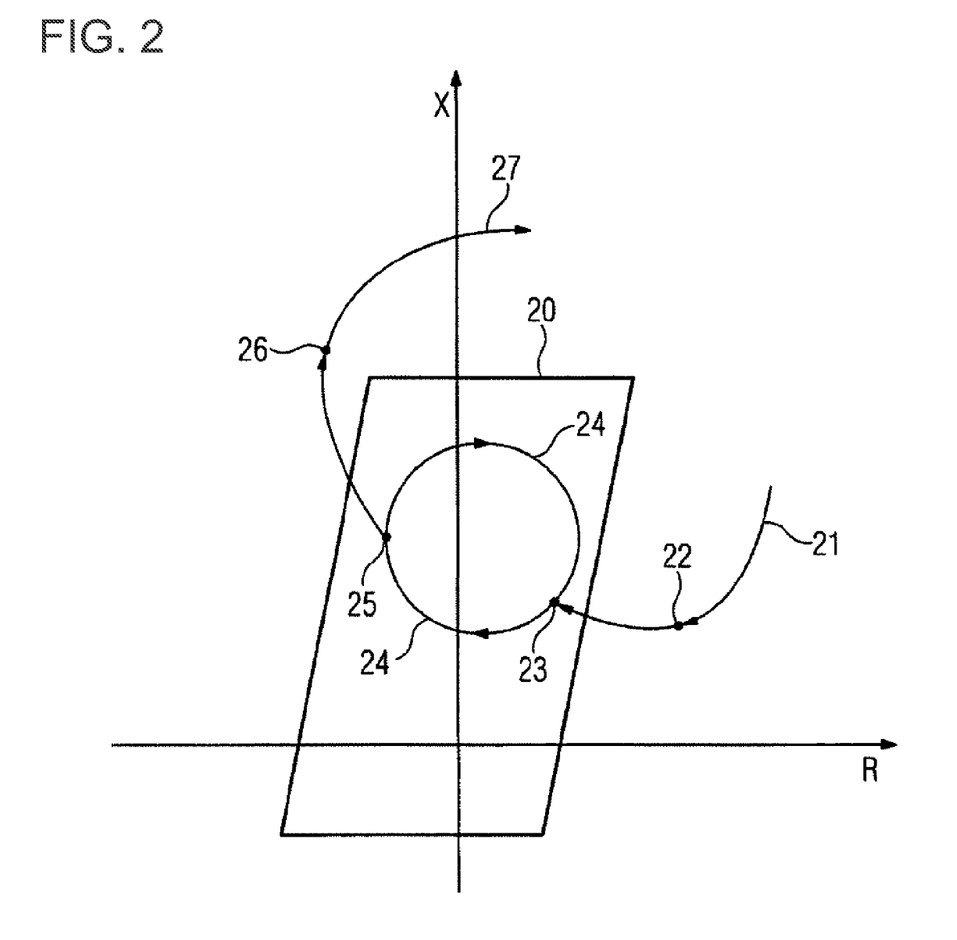
FIG. 2 shows an illustration of an oscillation with a fault superimposed on it, on a complex impedance plane.

In this context, by way of example, FIG. 2 uses a so-called R-X diagram to show the profile of impedance values which are recorded in the event of an external fault with an oscillation occurring at the same time. By way of example, the following explanation relates to the protective device 15b shown in FIG. 1.

Impedance values are illustrated on the complex impedance plane, that is to say in the form of so-called complex numbers with real and imaginary components, on an R-X diagram. While the real component of the impedance is shown on the axis inscribed "R", which real component is also referred to as the so-called resistance component and indicates the ohmic resistance component of the impedance, the axis which is annotated "X" shows the imaginary component of the impedance, which is also referred to as the so-called reactance and indicates the inductive and/or capacitive part of the impedance values.

Each impedance value is defined by current and voltage measured values recorded at a respective measurement point, in the present example the measurement point 16b in FIG. 1, with these measured values normally being current and voltage vector measured values including the amplitude and phase angle. The respective impedance values are likewise represented by the amplitude and phase angle in the form of a so-called impedance vector, which runs from the origin of the R-X diagram to the value which represents the corresponding amplitude and corresponding phase angle. For the sake of clarity, only the profile of the vector tips is shown, as a curve profile, in each case on the R-X diagram in FIG. 2.

A so-called tripping polygon 20 is illustrated within the R-X diagram, indicating that area on the impedance plane which impedance values normally assume during internal or external faults. Normally, if the impedance values are within the tripping polygon, a tripping signal is produced, in order to open the appropriate circuit breaker.

The profile of impedance values in the case of an oscillation on which an external fault is superimposed, such as the fault at the fault location 19 (cf. FIG. 1), will be described, by way of example, with reference to FIG. 2.

A first curve profile 21 describes the profile of the impedance values when an oscillation occurs without any fault being present. An oscillation such as this can be identified on the basis of familiar methods, such as the checks explained initially for monotonicity, continuity and sudden changes in the impedance values. A statement can likewise be made on whether the oscillation is balanced, that is to say whether it is uniform between all three phase conductors, or whether this is an unbalanced oscillation.

The external fault has occurred at the point 23 on the R-X diagram shown in FIG. 2; in this case, the impedance values change suddenly from the point 22 to the point 23 within the tripping polygon 20. While the external fault is present, the impedance values run on an elliptical path curve 24, because of the oscillation which is also taking place at the same time being superimposed on them, although the diameter of this path curve 24 is less than the diameter of the path curve 21 in the case of the oscillation without any fault being present. The path curve 24 can be passed over repeatedly until the fault is disconnected.

After the external fault has been disconnected by the protective device 15b at the point 25 on the R-X diagram, the profile of the impedance values returns suddenly to a value at the point 26, which is outside the tripping polygon 20, and then returns to the elliptical path curve profile 27 during the oscillation, on which a fault is now no longer superimposed.

In the present example, the protective device 15*b* must therefore be able to identify the onset of the external fault during an oscillation at the point 23, and the end of the external fault at the point 25, and the continuation of the oscillation beyond the point 26. Only if such identification can be carried out reliably can the protective device 15*b* still be used as a reserve protective device for the protective device 15*d*.

Specifically, the method of operation of the protective device 15*b* must appear as follows for the situation illustrated in FIG. 2: during the profile 21, the protective device 15*b* must identify the oscillation that is taking place and must output a so-called oscillation signal which on the one hand indicates the oscillation and on the other hand prevents the distance protection function from outputting a tripping signal to a circuit breaker if the impedance values were to enter the tripping polygon as the oscillation continues. At the point 22, the protective device 15*b* must identify the occurrence of an external fault and must produce a fault signal, which indicates the presence of the fault during the oscillation. The fault signal results in cancellation or at least blocking of the oscillation signal. The fault signal must be maintained while the external fault is present in the area 24, despite the oscillation additionally taking place there, that is to say despite characteristic features of an oscillation in the area 24, the protective device 15*b* must not identify the area 24 as an oscillation, but as a fault, in order that it can carry out its reserve protection function for the protective device 15*d*.

This is because, if the protective device 15*d* will not disconnect the fault at the fault location 19 within the time interval assigned for this purpose, the protective device 15*b* would open its associated circuit breaker, as already explained with reference to FIG. 1.

Furthermore, as soon as the external fault has been disconnected by the protective device 15*d*, that is to say it has been switched off, the protective device 15*b* must identify the end of the fault at the point 26, and must cancel the fault signal in order to make it possible to once again indicate the continuation of the oscillation, by producing the oscillation signal again, from the start of the profile 27.

Figure 3:
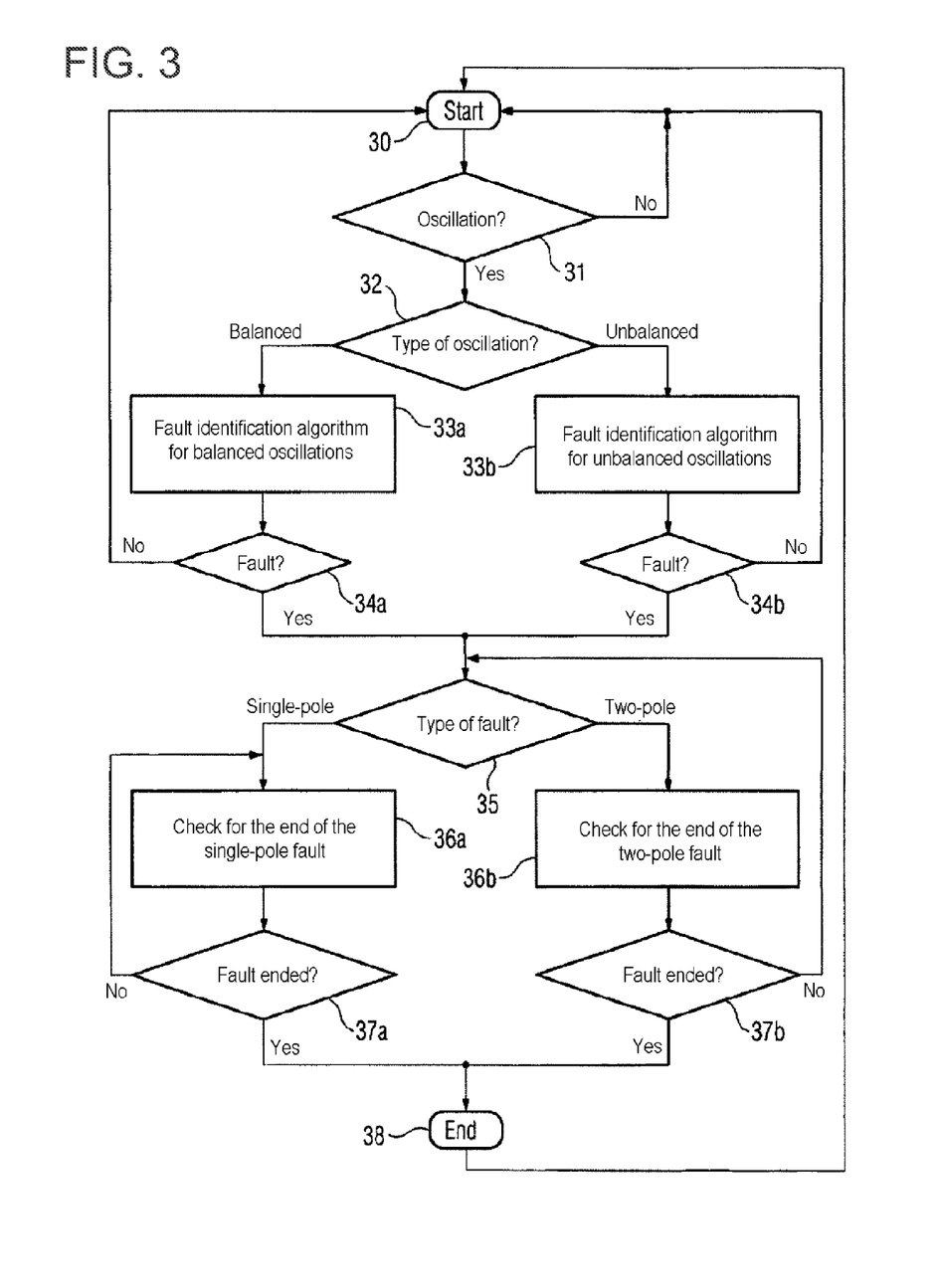
FIG. 3 shows a schematic overview of one exemplary embodiment of a method for production and cancellation of a fault signal.

The following figures will be used to explain how the described method of operation can be achieved. First of all, in this context, FIG. 3 shows a schematic overview of the complete algorithm in the form of a method flowchart. An algorithm such as this is normally implemented in the form of device software, which is processed by a control device of a protective device.

The check starts in step 30. A check is first of all carried out in step 31 to determine whether an oscillation is present in the electrical power supply system. By way of example, impedance values calculated from current and voltage measured values are for this purpose checked for monotonicity, continuity and a sudden-change response. If the curve profile described by the impedance values is moving monotonically, continuously and without any sudden changes, an oscillation is identified, and an oscillation signal is produced. If no oscillation is taking place, the algorithm starts once again at step 30.

If an oscillation is present, then a check is carried out in step 32 to determine whether this is a balanced or an unbalanced oscillation. By way of example, this can be done by carrying out the check described above for an oscillation for each phase of the electrical power supply system and, if a uniform oscillation is found, in all three phases, deducing a balanced oscillation, while an unbalanced oscillation is identified in the case of an oscillation in which the phases differ from one another, or an oscillation which is restricted to only one or two phases. A balanced oscillation can also be identified by identifying an oscillation for one phase and identifying a balanced response on the basis of the balanced components of the current, that is to say the positive phase-sequence system current, the negative phase-sequence system current and the zero phase-sequence system current. In the case of a balanced response, positive phase-sequence system current components essentially exist, while scarcely any zero phase-sequence system and negative phase-sequence system currents occur.

Depending on whether a balanced or an unbalanced oscillation has been identified, a balance signal is produced which indicates the corresponding type of oscillation. Depending on whether the balance signal indicates a balanced or an unbalanced oscillation, a corresponding fault identification algorithm for balanced or unbalanced oscillations is carried out in steps 33*a* and 34*a*, or 33*b* and 34*b*, respectively.

If no fault is identified in steps 33*a* and 34*a*, or 33*b* and 34*b*, then the algorithm once again starts at the point 30. However, if the existence of a fault is identified, then a fault signal is produced, and the nature of the fault is then checked in step 35 to determine whether this is a single-pole or a two-pole fault. This can be done, for example, by checking phase-by-phase whether the calculated impedance values are within the tripping polygon and, at the same time, either no significant change in the impedance values has occurred or a sudden-change response has been identified in the profile of the impedance values. Both cases indicate a fault in the respective phase.

If the fault is an internal fault, then the corresponding protective device must trip its circuit breaker and therefore disconnect the faulty section from the power supply system. In this case, the process is ended even before step 35 and is started again, if appropriate, after reconnection of the relevant section. If an external fault is present, then the process is continued in steps 36*a* and 36*b*. By way of example, it is possible to distinguish between an internal fault and an external fault on the basis of the position of the calculated impedance values in the tripping polygon.

Depending on whether a single-pole or a two-pole external fault has been identified in step 35, a check for the end of this single-pole or two-pole fault is carried out in steps 36*a* and 37*a*, or 36*b* and 37*b*. If it is found that the fault is still present, that is to say it has not ended, then the check is continued again on the basis of the respective type of fault. However, if it is found that the fault has ended, the fault signal is canceled, the algorithm ends in step 38, and can be started again in step 30. If the fault is present beyond a certain time period, that is to say no end of the fault is found within this time, then it can be assumed that the protective device which is directly responsible for the present fault is malfunctioning. The protective device which has identified the external fault can in this case open its circuit breaker, and therefore disconnect the fault, in its function as a reserve protective device.

Figure 4:
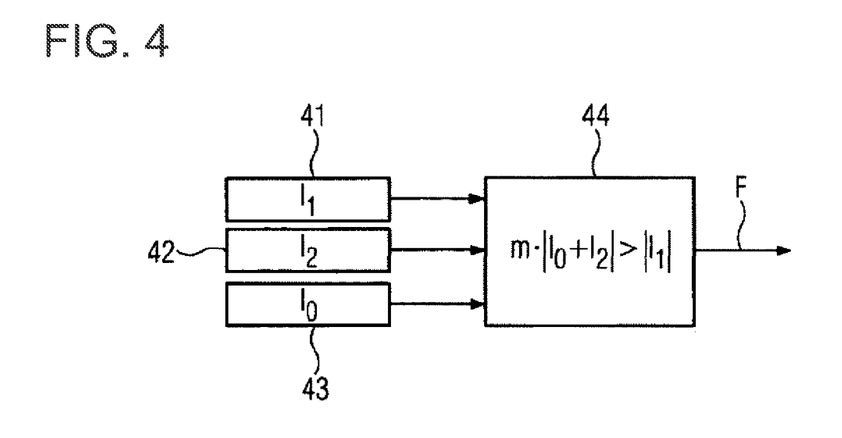
FIG. 4 shows a schematic method flowchart in order to explain fault identification in the case of a balanced oscillation.

The fault identification algorithm which is run in step 33*a* as shown in FIG. 3 will be explained with reference to FIG. 4 for the situation in which a balance signal is indicating a balanced oscillation. In this case, the fault identification can be carried out particularly easily since all that is necessary is to check for an unbalanced state. This is based on the knowledge that, in the event of a balanced oscillation, any unbalance which occurs must indicate either a single-pole or a two-pole fault. Therefore, as shown in FIG. 4, the balanced components, that is to say the so-called positive phase-sequence system current $I_1$ in step 41, the so-called negative phase-sequence system current $I_2$ in step 42, and the so-called zero phase-sequence system current $I_0$ in step 43, are calculated from the three phase currents. A person skilled in the art is sufficiently familiar with the determination of positive, negative and zero phase-sequence system currents, and this process will therefore not be explained in any more detail at this point.

In step 44, a check is carried out to determine whether the balanced components (that is to say the positive, negative and zero phase-sequence system current) indicate a balanced state or an unbalanced state. A balanced state is present when the positive phase-sequence system current essentially predominates, while the zero and negative phase-sequence system currents virtually do not exist. A check is therefore carried out in step 44 to determine whether the sum of the negative and positive phase-sequence system currents, multiplied by a factor m, is greater than the positive phase-sequence system current, as described in the following equation:

$$m \cdot |I_0 + I_2| > |I_1|$$

If this inequality is satisfied, that is to say the zero and negative phase-sequence system currents have a significant component of balanced components, then an unbalanced state, and therefore a fault, are identified, and a fault signal F is produced. The level of the factor m can in this case advantageously be chosen as a function of the level of the positive phase-sequence system current, in order to compensate for any noise which may be present when the positive phase-sequence system currents are small. In this case, the factor m rises when the positive phase-sequence system current rises, and falls when the positive phase-sequence system current falls. The factor m can normally be in the range from about 10 to about 160, and a value of about 100 is preferred for the factor m in the region of the rated current, that is to say the current for which the power supply system is designed.

Figure 5:
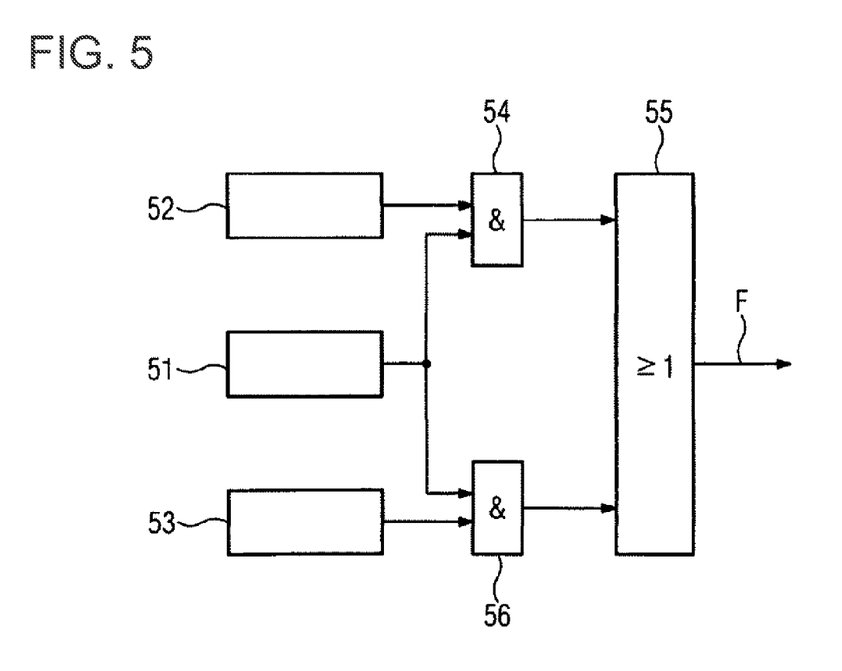
FIG. 5 shows a schematic method flowchart in order to explain the identification of a fault in the case of an unbalanced oscillation.

FIG. 5 is intended to show the fault identification algorithm for a balance signal which indicates an unbalanced oscillation (step 33b in FIG. 3). In the case of an unbalanced oscillation, a check is first of all carried out in step 51 to determine whether the impedance values formed on the basis of current and voltage measured values are within the tripping polygon. A check is carried out in step 52 to determine whether the impedance values for successively determined impedance values have remained virtually at one point, that is to say a check is carried out to determine whether the change between successive impedance values is below a specific threshold value. Finally, a check is carried out in step 53 to determine whether the profile of the impedance values has a sudden-change response, that is to say whether the change between two impedance values is above a predetermined threshold value. This is because both the impedance values remain at one point and a sudden-change response are clear features of an existing fault.

The outputs of the blocks 51 and 52 are fed to a first AND gate 54, which is in turn connected on the output side to one input of an OR gate 55. The outputs of the blocks 51 and 53 are fed to a second AND gate 56, which is connected on the output side to a further input of the OR gate 55. The logic operation which this results in means that a fault signal is output on the output side of the OR gate 55 only when the impedance values are within the tripping polygon and, at the same time, either successive impedance values have no significant change or a sudden-change response has been identified in the profile of the impedance values. This check is carried out for each phase, thus allowing a decision to be made for each phase as to whether or not a fault is present.

The algorithm explained in FIG. 5 is suitable for making a decision as to whether a single-pole or two-pole fault is present. Therefore, while the fault identification algorithm itself provides a statement for unbalanced oscillations according to step 33b in FIG. 3 as to whether a single-pole or a two-pole fault is present, the algorithm explained with reference to FIG. 5 must be run through again in order to distinguish between the faults identified in step 33a in FIG. 3 and the type of fault in step 35.

Figure 6:
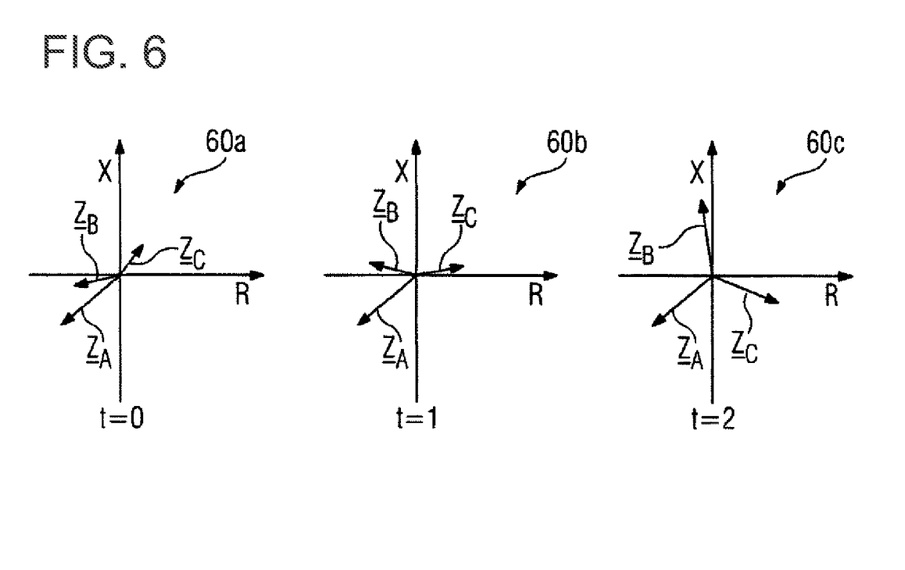
FIG. 6 shows three R-X diagrams in order to explain an oscillation with a single-pole fault at the same time.

The procedure for checking for the end of a single-pole fault according to step 36a in FIG. 3 will be explained in more detail with reference to FIG. 6. FIG. 6 shows three R-X diagrams 60a, 60b and 60c, which contain impedance values, as impedance vectors, recorded at successive times (t=0 to t=2). While the impedance vector $Z_A$ for phase A is associated with the faulty phase and remains at the point defined by the fault impedance on the R-X diagram, the impedance vectors $Z_B$ and $Z_C$ for the phases B and C oscillate, as is evident from the continuously changing amplitudes and phase angles of these vectors.

Initially, the inverse procedure to that for checking for the occurrence of a fault in the event of a balanced oscillation can, of course, be used to check for the end of the single-pole fault, that is to say a check to determine whether a balanced state is recreated. However, as is clear from the R-X diagram 60c for the time t=2, a simple test such as this for recreation of a balanced state after a single-pole fault cannot on its own be used to make a statement as to whether the single-pole fault has ended since, despite the continued existence of the single-pole fault, the position of the vectors $Z_A$, $Z_B$, and $Z_C$ on the R-X diagram randomly corresponds precisely to a balanced state, that is to say the amplitudes of the respective vectors correspond, while there is a phase angle of 120° between each of the respective vectors. Furthermore, a test such as this can also not be used objectively when an unbalanced oscillation is present.

Therefore, in order to check for the end of a single-pole fault, successive impedance vectors of the faulty phase A are checked to determine whether their profile on the R-X diagram approximately uniformly matches the profile of the impedance vectors for the sound phases B and C. A so-called "impedance path" can, specifically, be determined for this purpose, indicating the change in a vector between two or more successive times.

If the impedance paths for the faulty phase A and the sound phases B and C correspond, then it can be assumed that the faulty phase A is once again carrying out a uniform oscillating movement with the sound phases B and C, and that the fault has ended. For simplification, this test can also be carried out simply with respect to one of the oscillating phases B and C.

Figure 7:
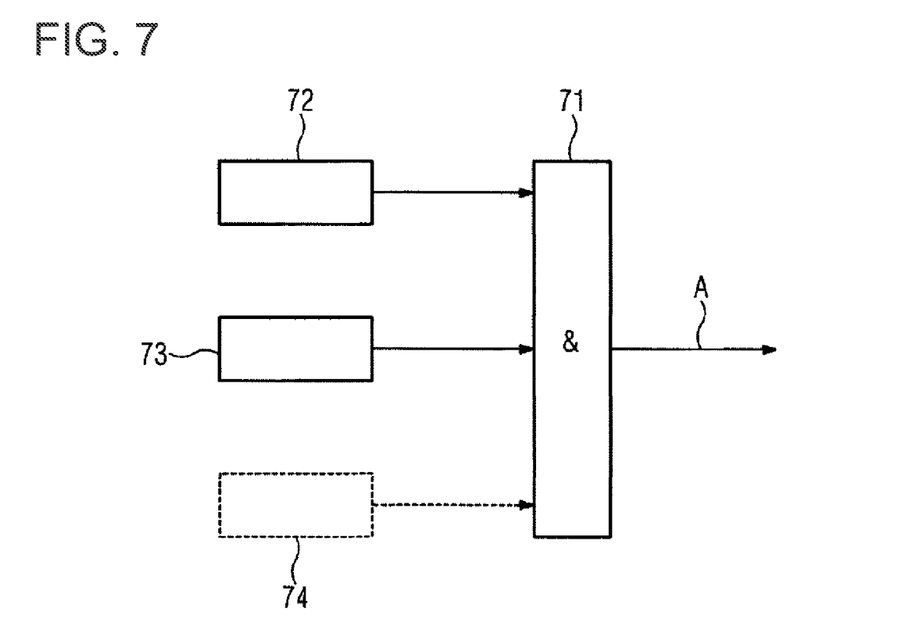
FIG. 7 shows a schematic method flowchart in order to explain a check for the continued existence of a single-pole fault during an oscillation.

FIG. 7 illustrates a corresponding logic diagram. An AND gate 71 is accordingly fed with a signal from a block 72 when a single-pole fault is present. The block 73 compares the impedance paths for the respective impedance vectors, that is to say the changes between impedance vectors recorded at successive times for the faulty phase A and at least one sound phase B or C. If there are no significant differences between these impedance paths, then block 73 likewise outputs an output signal to the AND gate 71. In this case, the AND gate 71 then outputs an output signal A which cancels the fault signal indicating the single-pole fault since, in a situation such as this, only the oscillation is still present, and the fault has ended.

In addition, as is indicated by a dashed-line block 74, a check can be carried out for a balanced state of the balanced components; if the positive phase-sequence system predominates over the negative phase-sequence system and the zero phase-sequence system, then a balanced state is assumed again:

$$m \cdot |I_0 + I_2| < |I_1|$$

Once again, the assumptions described above apply to the factor m. In this case, an output signal is output to the AND gate 71 and, in this case, the AND gate outputs an output signal leading to the cancellation of the existing fault signal only if a balanced state has been recreated. The check in block 74 can, however, be used sensibly only if a balanced oscillation is present since, in the case of an unbalanced oscillation in block 74, no balanced state would be identified.

Figure 8:
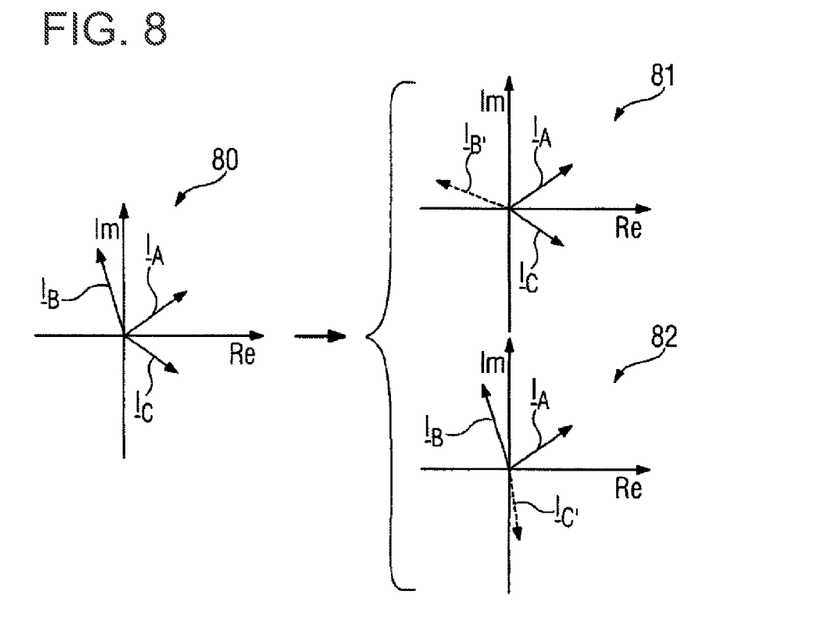
FIG. 8 shows three current vector diagrams in order to explain the procedure for checking the continued existence of a two-pole fault during an oscillation.

The procedure for checking for the end of a two-pole fault according to steps 36b and 37b in FIG. 3 will be explained with reference to FIG. 8. In the case of a two-pole fault, the procedure described for the single-pole fault using the balanced components is not sufficient, because this procedure cannot distinguish between a single-pole fault and a two-pole fault. Since, for example, it is always possible for only one of the two phases to be disconnected again in the case of a two-pole fault, while the other still remains faulty, it is necessary to distinguish in this way between the existence of a single-pole fault and a two-pole fault.

The procedure at the end of a two-pole fault initially includes mapping of the two-pole fault onto two single-pole faults, followed by a check. The mapping of the two-pole fault onto two single-pole faults will be explained in more detail with reference to FIG. 8. In this context, FIG. 8 shows a first current vector diagram 80, illustrating current vectors $I_A$, $I_B$ and $I_C$ of an oscillating phase A and two faulty phases B and C. In order to check whether the phases B and C are still faulty, the system described in the current vector diagram 80 is mapped onto two systems, which each describe a single-pole fault, as in current vector diagrams 81 and 82. For this purpose, the current vector $I_B$ for the faulty phase B is replaced by an assumed current vector $I_{B'}$, for a fictional phase B' in the current vector diagram 81. This fictional phase B' is likewise assumed to be an oscillating phase and relates to the actually oscillating phase A, that is to say the assumed current vector $I_{B'}$, has the same amplitude as the current vector $I_A$, and is shifted in phase through 120° with respect to it. The current vector $I_C$ for the faulty phase C remains unaffected in the current vector diagram 81.

In a corresponding manner, the current vector $I_C$ for the faulty phase C is replaced by an assumed current vector $I_{C'}$ of a fictional phase C' in the third current vector diagram 82, which current vector $I_{C'}$ has an amplitude which corresponds to that of the current vector $I_A$ for the phase A, and is at a phase angle of 120° with respect to it. The faulty phase B remains unaffected.

The system according to the current vector diagram 81 is used to check whether the phase C is still faulty. A resultant test negative phase-sequence system current is calculated for this purpose, using the current vectors $I_A$, $I_{B'}$, and $I_C$. An actual negative phase-sequence system current is likewise determined using the actual current vectors $I_A$, $I_B$ and $I_C$ and is compared with the test negative phase-sequence system current. The quotient of the negative phase-sequence system current and the test negative phase-sequence system current is formed for this purpose. If the quotient is above a predetermined threshold, for example above 5, then it can be deduced from this that a balanced system has been recreated by replacing the current vector $I_B$ for the phase B by the assumed current vector $I_{B'}$. This leads to the conclusion that the phase C is no longer affected by the fault.

The system shown in the current vector diagram 82 is correspondingly used to check whether the phase B is still affected by the fault, by forming a test negative phase-sequence system current using the current vectors $I_A$, $I_B$ and $I_{C'}$, and this is compared with the negative phase-sequence system current formed using the actual current vectors $I_A$, $I_B$ and $I_C$. If the quotient of the negative phase-sequence system current and the test negative phase-sequence system current is above a specific threshold in this case as well, then it can be deduced from this that the phase B is no longer affected by the fault. If the quotient is below the specific threshold, then the fault on the phase B is still present.

FIG. 9 once again shows this checking procedure, in the form of a schematic flowchart. Step 91 relates to one of the two faulty phases—phase B is assumed by way of example—and the current vector $I_B$ is replaced by the assumed current vector $I_{B'}$. The current vectors $I_A$, $I_{B'}$, and $I_C$ are then used to calculate the test negative phase-sequence system current in step 92. Step 93 uses the system which is actually present, with the measured current vectors $I_A$, $I_B$ and $I_C$, from which the actual negative phase-sequence system current is calculated in step 94. The test negative phase-sequence system current is then compared with the negative phase-sequence system current in step 95, by forming the quotient of the negative phase-sequence system current and the test negative phase-sequence system current, and this is compared with a threshold value, for example the value 5. If the quotient is above the threshold value, then that faulty phase which has not been replaced—that is to say the phase C in the present example—is no longer affected by the fault, while the fault relating to this phase is still present if the threshold value is undershot.

Figure 9:
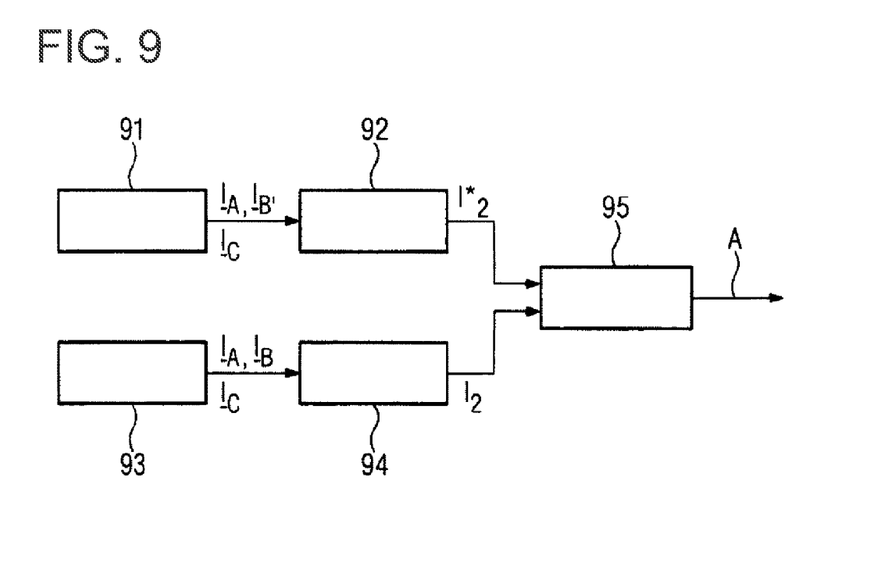
FIG. 9 shows a schematic method flowchart in order to explain the check for continued existence of a two-pole fault during an oscillation.

An output signal A is therefore produced in block 95 when the threshold value has been overshot and the fault relating to the phase under consideration is no longer present. This output signal A can be used to cancel the fault signal.

The procedure described here should be carried out not only for phase currents at a single time but for a profile comprising a plurality of phase currents which have been recorded at successive times. This results in the result being more reliable, since brief fluctuations relating to the negative phase-sequence system current or the test negative phase-sequence system current are equalized out.

Figure 10:
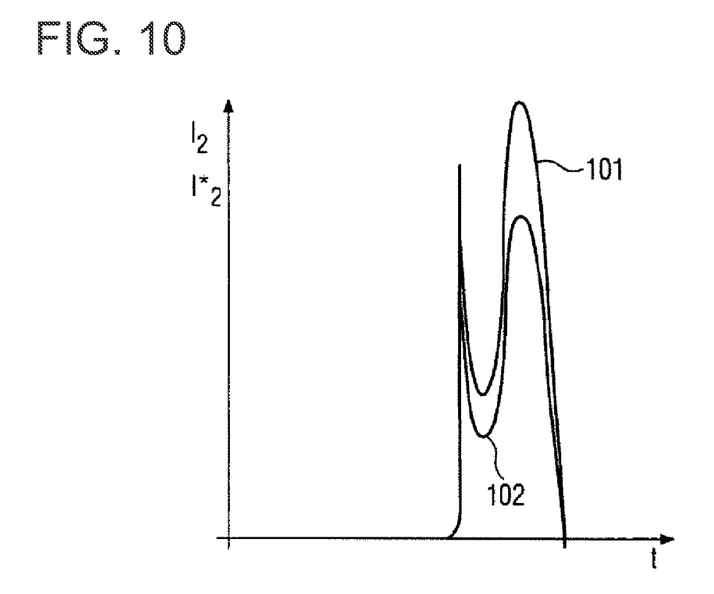
FIG. 10 shows a diagram with a first example of possible profiles of negative phase-sequence system currents and test negative phase-sequence system currents.
Figure 11:
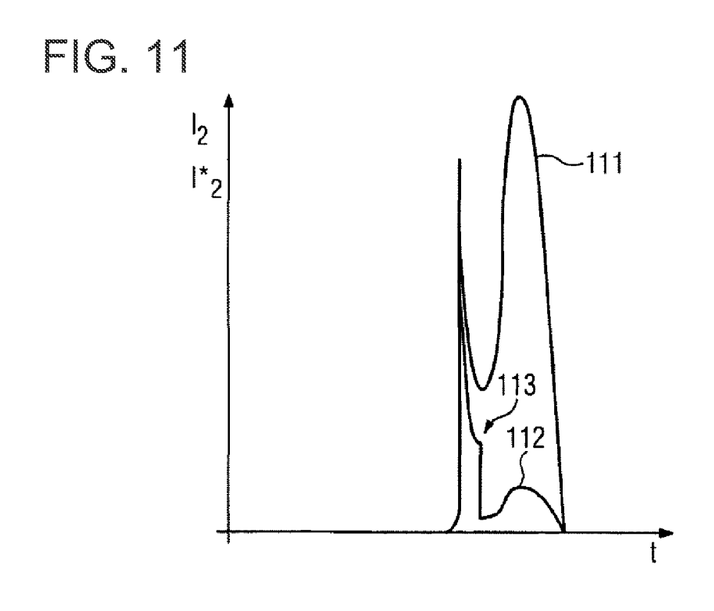
FIG. 11 shows a diagram with a second example of possible profiles of negative phase-sequence system currents and test negative phase-sequence system currents.

FIGS. 10 and 11 respectively show diagrams in which the profile of the negative phase-sequence system current $I_2$ and the test negative phase-sequence system current $I_2^*$ are plotted against the time t. In the diagram shown in FIG. 10, the profile of the negative phase-sequence system current is indicated by the curve 101, while the profile of the test negative phase-sequence system current is indicated by 102. In the case of the profiles shown by way of example in FIG. 10, the fault relating to the phase under consideration has not ended.

In a corresponding manner, the profile of the negative phase-sequence system current is indicated by the curve 111 in FIG. 11, while the profile of the test negative phase-sequence system current is indicated by the curve 112. Therefore, in the case of the profiles shown by way of example in FIG. 11, the fault relating to the phase under consideration has not ended. The disconnection of the fault results in a sudden change 113 in the profile of the curve 112.

As can easily be seen, the quotient of the negative phase-sequence system current (curve 111) and the test negative phase-sequence system current (curve 112) which results from the situation illustrated in FIG. 11 assumes a considerably higher value than the quotient which results from FIG. 10, which results from the negative phase-sequence system current (curve 101) and the test negative phase-sequence system current (curve 102). FIG. 11 therefore shows the result of the check for the situation in which the phase being investigated is no longer affected by the fault, while the investigated phase is still affected by the fault in the case shown in FIG. 10.

In summary, the invention indicates a method by means of which single-pole and two-pole faults which occur during an oscillation can be reliably and quickly identified and, in the case of external faults, the continued oscillation after the end of the fault can also be identified. A method such as this can be carried out, for example, by a control device for an electrical distance protective device and allows the distance protective device a reliable method of operation matched to the respective case. A distance protective device having a correspondingly designed control device is therefore, for example, also able to provide a reserve protection function in the case of external faults which occur during oscillations since, according to the described method, the fault signal which has been produced and canceled can be used to cancel an oscillation signal which indicates the oscillation.

The invention claimed is:

1. A method of producing a fault signal that indicates a single-pole fault or a two-pole fault in a three-phase electrical power supply system, the fault having occurred during a present electrical oscillation in the electrical power supply system, the method which comprises:
   producing a balance signal during the oscillation, the balance signal indicating whether the oscillation is balanced or unbalanced;
   carrying out a check by checking the phases of the electrical power supply system for the presence of a fault, and thereby using the balance signal to carry out the check;
   if the balance signal indicates a balanced oscillation, determining the balanced components from phase currents detected in the power supply system, in the form of a positive phase-sequence system current, a negative phase-sequence system current and a zero phase-sequence system current, and carrying out the check for the presence of a fault by comparing these balanced components; and
   wherein the check comprises comparing a sum of the zero phase-sequence system current and the negative phase-sequence system current with the positive phase-sequence system current, and identifying a fault if a product of the sum and a factor exceeds the positive phase-sequence system current; and
   producing the fault signal if a fault has been identified during the check.

2. The method according to claim 1, wherein the fault signal results in a cancellation of an oscillation signal indicating the oscillation.

3. The method according to claim 1, which further comprises:
   checking a profile of impedance values for each phase in order to distinguish between a single-pole fault and a two-pole fault; and
   deducing a presence of a fault in the respective phase if:
      at least one impedance value of the relevant phase lies within a tripping range on a complex impedance plane, and a change between successive impedance values lies below a predetermined threshold value; or
      at least one impedance value of the relevant phase lies within a tripping range on the complex impedance plane, and a sudden change has occurred between successive impedance values.

4. The method according to claim 1, which comprises:
   when a fault signal is present, continuously checking to determine whether the fault is still present; and
   cancelling the fault signal if the check indicates that the fault is no longer present.

5. The method according to claim 4, which comprises, in the case of a two-pole fault, in order to check whether the fault is still present, calculating test negative phase-sequence system current values from phase currents detected with respect to the no-fault phase and one of the two faulty phases and from assumed phase currents for a fictional phase that is shifted through 120° with respect to the no-fault phase, and comparing the test negative phase-sequence system current values with negative phase-sequence system current values calculated on the basis of the actual phase currents, and deducing an end of the fault with respect to the respective faulty phase being considered if a quotient of the respective negative phase-sequence system current values and the respective test negative phase-sequence system current values lies above a predetermined threshold value.

6. The method according to claim 4, which comprises, in the case of a single-pole fault, checking whether the fault is still present by comparing impedance values calculated with respect to the faulty phase with impedance values calculated with respect to non-faulty phases, and deducing a presence of the fault based on the comparison.

7. The method according to claim 6, which comprises comparing the impedance values calculated with respect to the faulty phase with the impedance values calculated with respect to the non-faulty phases and deducing an end of the fault if the paths covered by the respective successive impedance values are approximately the same.

8. The method according to claim 6, which comprises determining balanced components of the phase currents, and comparing the balanced components in order to deduce whether the fault is still present.

9. The method according to claim 8, which comprises comparing a sum of the zero phase-sequence system current and the negative phase-sequence system current with the positive phase-sequence system current, and identifying an indication of an end of a fault if the product of the sum and a factor lies below the positive phase-sequence system current.

10. The method according to claim 1, which comprises dynamically matching the factor to a level of the positive phase-sequence system current, with a rising positive phase-sequence system current causing an increase in the factor.

11. In an electrical power supply system, an electrical protective device for monitoring the electrical power supply system, the device comprising:
   a measurement device for detecting measured values indicating a current and a voltage at a measurement point in the power supply system; and
   a control device for processing the measured values and for carrying out any of the method according to claim 1.

12. A method of producing a fault signal that indicates a single-pole fault or a two-pole fault in a three-phase electrical power supply system, the fault having occurred during a present electrical oscillation in the electrical power supply system, the method which comprises:
   producing a balance signal during the oscillation, the balance signal indicating whether the oscillation is balanced or unbalanced;
   carrying out a check by checking the phases of the electrical power supply system for the presence of a fault, and thereby using the balance signal to carry out the check; and
   producing the fault signal if a fault has been identified during the check;
   when a fault signal is present, continuously checking to determine whether the fault is still present; and
   cancelling the fault signal if the check indicates that the fault is no longer present;
   in the case of a single-pole fault, checking whether the fault is still present by comparing impedance values calculated with respect to the faulty phase with impedance values calculated with respect to non-faulty phases, and deducing a presence of the fault based on the comparison;

determining balanced components of the phase currents, and comparing the balanced components in order to deduce whether the fault is still present; and comparing a sum of the zero phase-sequence system current and the negative phase-sequence system current with the positive phase-sequence system current, and identifying an indication of an end of a fault if the product of the sum and a factor lies below the positive phase-sequence system current.

13. In an electrical power supply system, an electrical protective device for monitoring the electrical power supply system, the device comprising:

a measurement device for detecting measured values indicating a current and a voltage at a measurement point in the power supply system; and a control device for processing the measured values and for carrying out any of the methods according to claim 12.

14. A method of producing a fault signal that indicates a single-pole fault or a two-pole fault in a three-phase electrical power supply system, the fault having occurred during a present electrical oscillation in the electrical power supply system, the method which comprises:

producing a balance signal during the oscillation, the balance signal indicating whether the oscillation is balanced or unbalanced;

carrying out a check by checking the phases of the electrical power supply system for the presence of a fault, and thereby using the balance signal to carry out the check;

producing the fault signal if a fault has been identified during the check;

when a fault signal is present, continuously checking to determine whether the fault is still present, and cancelling the fault signal if the check indicates that the fault is no longer present; and in the case of a two-pole fault, in order to check whether the fault is still present, calculating test negative phase-sequence system current values from phase currents detected with respect to the no-fault phase and one of the two faulty phases and from assumed phase currents for a fictional phase that is shifted through 120° with respect to the no-fault phase, and comparing the test negative phase-sequence system current values with negative phase-sequence system current values calculated on the basis of the actual phase currents, and deducing an end of the fault with respect to the respective faulty phase being considered if a quotient of the respective negative phase-sequence system current values and the respective test negative phase-sequence system current values lies above a predetermined threshold value.

15. In an electrical power supply system, an electrical protective device for monitoring the electrical power supply system, the device comprising:

a measurement device for detecting measured values indicating a current and a voltage at a measurement point in the power supply system; and a control device for processing the measured values and for carrying out any of the methods according to claim 14.

16. A method of producing a fault signal that indicates a single-pole fault or a two-pole fault in a three-phase electrical power supply system, the fault having occurred during a present electrical oscillation in the electrical power supply system, the method which comprises:

producing a balance signal during the oscillation, the balance signal indicating whether the oscillation is balanced or unbalanced;

carrying out a check by checking the phases of the electrical power supply system for the presence of a fault, and thereby using the balance signal to carry out the check; and if the balance signal indicates an unbalanced oscillation, determining a profile of impedance values for each phase; and deducing a presence of a fault in the respective phase if:

at least one impedance value of the relevant phase lies within a tripping range on a complex impedance plane and a change between successive impedance values lies below a predetermined threshold value; or at least one impedance value of the relevant phase lies within a tripping range on the complex impedance plane and a sudden change has occurred between successive impedance values; and producing the fault signal if a fault has been identified during the check;

in the case of a two-pole fault, in order to check whether the fault is still present, calculating test negative phase-sequence system current values from phase currents detected with respect to the no-fault phase and one of the two faulty phases and from assumed phase currents for a fictional phase that is shifted through 120° with respect to the no-fault phase, and comparing the test negative phase-sequence system current values with negative phase-sequence system current values calculated on the basis of the actual phase currents, and deducing an end of the fault with respect to the respective faulty phase being considered if a quotient of the respective negative phase-sequence system current values and the respective test negative phase-sequence system current values lies above a predetermined threshold value.

17. The method according to claim 16, wherein the fault signal results in a cancellation of an oscillation signal indicating the oscillation.

18. In an electrical power supply system, an electrical protective device for monitoring the electrical power supply system, the device comprising:

a measurement device for detecting measured values indicating a current and a voltage at a measurement point in the power supply system; and a control device for processing the measured values and for carrying out the method according to claim 16.

19. The method according to claim 16, which comprises:

when a fault signal is present, continuously checking to determine whether the fault is still present; and cancelling the fault signal if the check indicates that the fault is no longer present.

20. The method according to claim 19, which comprises, in the case of a single-pole fault, checking whether the fault is still present by comparing impedance values calculated with respect to the faulty phase with impedance values calculated with respect to non-faulty phases, and deducing a presence of the fault based on the comparison.

21. The method according to claim 20, which comprises comparing the impedance values calculated with respect to the faulty phase with the impedance values calculated with respect to the non-faulty phases and deducing an end of the fault if the paths covered by the respective successive impedance values are approximately the same.

22. The method according to claim 20, which comprises determining balanced components of the phase currents, and comparing the balanced components in order to deduce whether the fault is still present.

23. The method according to claim 22, which comprises comparing a sum of the zero phase-sequence system current and the negative phase-sequence system current with the positive phase-sequence system current, and identifying an indication of an end of a fault if the product of the sum and a factor lies below the positive phase-sequence system current.

* * * * *